(12) United States Patent
Kudoh et al.

(10) Patent No.: US 10,030,691 B2
(45) Date of Patent: Jul. 24, 2018

(54) CABLE CONNECTION STRUCTURE FOR MOVABLE MEMBER

(75) Inventors: Shuichi Kudoh, Kanagawa (JP); Shinji Ichikawa, Kanagawa (JP); Ryuichi Yoshida, Guangzhou (CN)

(73) Assignees: ALPHA CORPORATION, Yokohama-shi, Kanagawa (JP); NISSAN MOTOR CO., LTD., Yokohama-shi, Kanagawa (JP)

( * ) Notice: Subject to any disclaimer, the term of this patent is extended or adjusted under 35 U.S.C. 154(b) by 418 days.

(21) Appl. No.: 14/115,225

(22) PCT Filed: Mar. 23, 2012

(86) PCT No.: PCT/JP2012/057640
§ 371 (c)(1),
(2), (4) Date: Nov. 1, 2013

(87) PCT Pub. No.: WO2012/153572
PCT Pub. Date: Nov. 15, 2012

(65) Prior Publication Data
US 2014/0069225 A1 Mar. 13, 2014

(30) Foreign Application Priority Data
May 12, 2011 (JP) .................................. 2011-107014

(51) Int. Cl.
*F16C 1/14* (2006.01)
*F16G 11/09* (2006.01)
(Continued)

(52) U.S. Cl.
CPC ................ *F16C 1/14* (2013.01); *E05B 79/06* (2013.01); *E05B 79/20* (2013.01); *E05B 85/16* (2013.01);
(Continued)

(58) Field of Classification Search
CPC .......... E05B 79/06; E05B 79/20; E05B 79/16; E05B 85/16; F16C 1/14; F16C 1/16;
(Continued)

(56) References Cited

U.S. PATENT DOCUMENTS 4,847,973 A * 7/1989 Lundeen .................... F16C 1/14
29/402.08
4,850,084 A * 7/1989 Iwasaki ................. E05F 11/486
24/115 R
(Continued)

FOREIGN PATENT DOCUMENTS

| CN | 1991113 A | 7/2007 |
|---|---|---|
| CN | 102011527 A | 4/2011 |

(Continued)

OTHER PUBLICATIONS

EPO Translation of the Description of FR 2938581 A1, Estevez et al., May 21, 2010.*

(Continued)

*Primary Examiner* — Daniel D Yabut
(74) *Attorney, Agent, or Firm* — Drinker Biddle & Reath LLP

(57) ABSTRACT

In a cable connection structure in which a roughly spherical cable end disposed at the tip of an inner wire is connected to a movable member, the movable member is provided with a pair of wing pieces that hold the inner wire, a cable insertion opening that guides the cable end to a space between the wing pieces, and a roughly elliptical cable end passage part that displaceably supports the cable end. The long axis of the roughly elliptical shape of the cable end passage part roughly coincides with the direction of insertion of the cable.

19 Claims, 7 Drawing Sheets

(51) Int. Cl.
*E05B 79/06* (2014.01)
*E05B 79/20* (2014.01)
*E05B 85/16* (2014.01)

(52) U.S. Cl.
CPC ......... *F16G 11/09* (2013.01); *Y10T 74/20462* (2015.01)

(58) Field of Classification Search
CPC .... F16C 1/262; F16C 1/265; Y10T 74/20462; Y10T 74/20456; Y10T 74/2045
See application file for complete search history.

(56) References Cited

U.S. PATENT DOCUMENTS

| | | | |
|---|---|---|---|
| 4,876,948 A * | 10/1989 | Yasukawa | B60K 31/06 180/177 |
| 5,794,994 A | 8/1998 | Miyagawa et al. | |
| 5,836,061 A * | 11/1998 | Castillo | F16C 1/14 24/115 R |
| 5,887,918 A * | 3/1999 | Okada | E05B 85/10 292/141 |
| 5,895,081 A | 4/1999 | Tanimoto et al. | |
| 7,431,357 B2 * | 10/2008 | Pudney | E05B 85/16 292/336.3 |
| 2002/0008389 A1 * | 1/2002 | Nomura | E05B 85/16 292/336.3 |
| 2003/0001399 A1 * | 1/2003 | Sato | E05B 79/06 292/336.3 |
| 2007/0120382 A1 | 5/2007 | Chevalier | |
| 2010/0230980 A1 * | 9/2010 | Ichikawa | E05B 85/16 292/336.3 |

FOREIGN PATENT DOCUMENTS

| | | | | |
|---|---|---|---|---|
| FR | 2914678 A1 * | 10/2008 | ............ | E05B 77/06 |
| FR | 2938581 A1 * | 5/2010 | ............ | E05B 79/06 |
| JP | H06-212846 A | 8/1994 | | |
| JP | H08-4709 A | 1/1996 | | |
| JP | 2011-052497 A | 3/2011 | | |
| JP | A-2012-25195 | 2/2012 | | |

OTHER PUBLICATIONS

EPO Translation of the Description of FR 2914678 A, Patouillard, Oct. 10, 2008.*

* cited by examiner

CABLE CONNECTION STRUCTURE FOR MOVABLE MEMBER

TECHNICAL FIELD

The present invention relates to a cable connection structure to a movable member.

BACKGROUND ART

Patent Document 1 discloses a door handle device for a vehicle using a cable device as an operating force transmission means. In this door handle device, a door handle (movable member) is provided with a notch through which an inner wire of an inner cable inserted and a locking part to which a cable end formed at a tip of the inner cable is locked. The mounting of the cable tip is made by passing a cable end and the inner wire through an end fitting part opened toward the surface and a slit extending from a peripheral edge of the end fitting part to a material end and communicating to a notch and then rotating the cable device around the locking part.

In a mounted state, the inner wire is inserted through an interior of a notch and therefore a movement thereof toward the surface is restricted. As a result, the detachment of the inner wire from the movable member is prevented.

However, there are the following problems in this device. Specifically, the locking part transmits an operating force in a drawing direction from an outer casing to the inner cable when the movable member is operated to rotate and the inner cable is returned to its original position by a tensile force loaded by an operated-side member when the movable member is returned to its initial rotational position.

However, in a case where the inner wire is difficult to follow the movable member due to an increase in a sliding resistance between the inner wire and the outer casing during a return stroke, there is a possibility that the inner wire is subjected to a buckling distortion under a compressive force from the end fitting part of the movable member and therefore the inner wire matches the slit.

Since the movement in a detaching direction of both the cable end and the inner wire is not restricted in a state where the inner wire directly faces the slit, there is a possibility that the inner cable is detached from the movable member. When the inner cable is detached from the movable member, it is not possible to transmit an operating force to the movable member.

RELATED ART DOCUMENTS

Patent Document

Patent Document 1: JP-A-06-212846

SUMMARY OF THE INVENTION

Embodiments of the present invention relate to a cable connection structure to a movable member and a door handle device for a vehicle incorporating the connection structure, which are capable of securely preventing the detachment of the inner cable from the movable member.

MODE FOR CARRYING OUT THE INVENTION

Hereinafter, the embodiments will be described with reference to the drawings. Here, the embodiments are illustrative of the present invention and not intended to limit the present invention. It should be noted that all the features and their combinations described in the illustrative embodiments are not necessarily considered as an essential part of the present invention.

Figure 1:
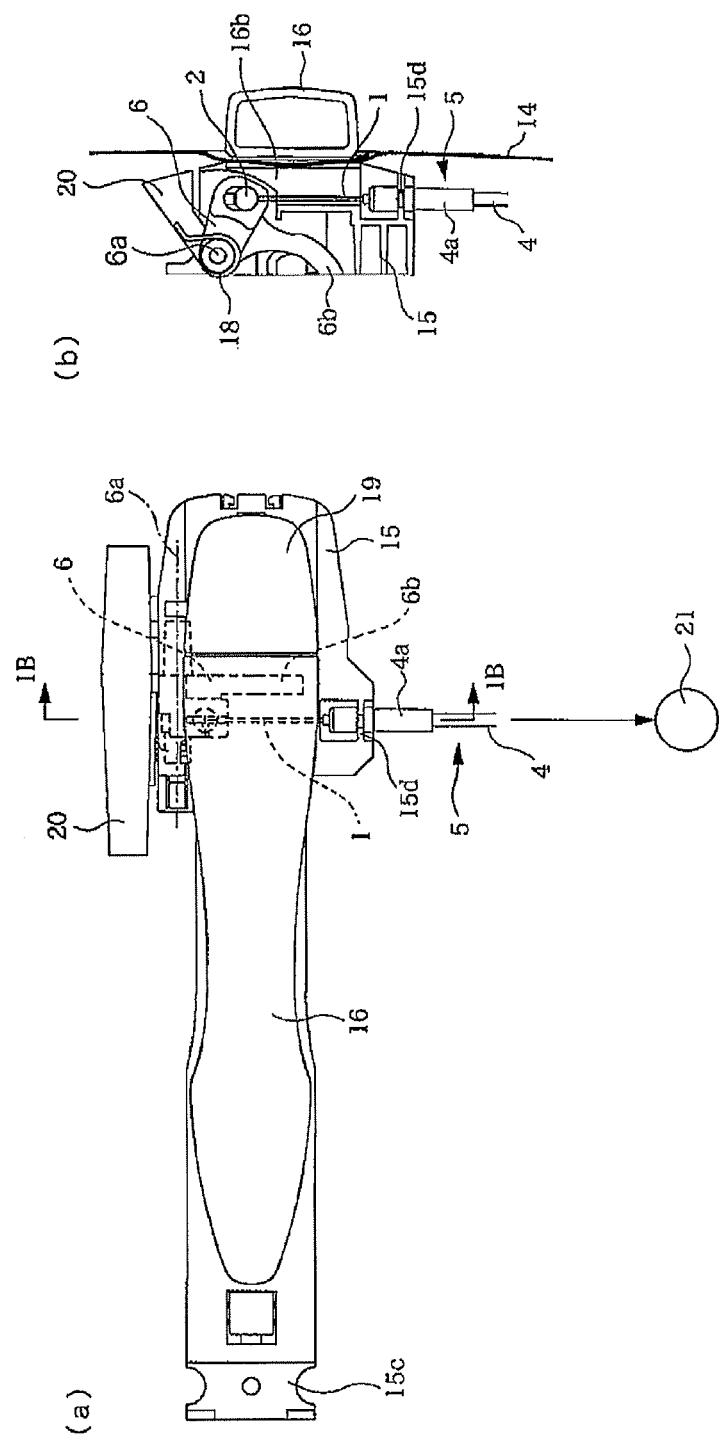
FIG. 1 shows a handle device, in which section (a) is a front view of the handle device and section (b) is a sectional view taken along a line 1B-1B in section (a) of FIG. 1.
Figure 2:
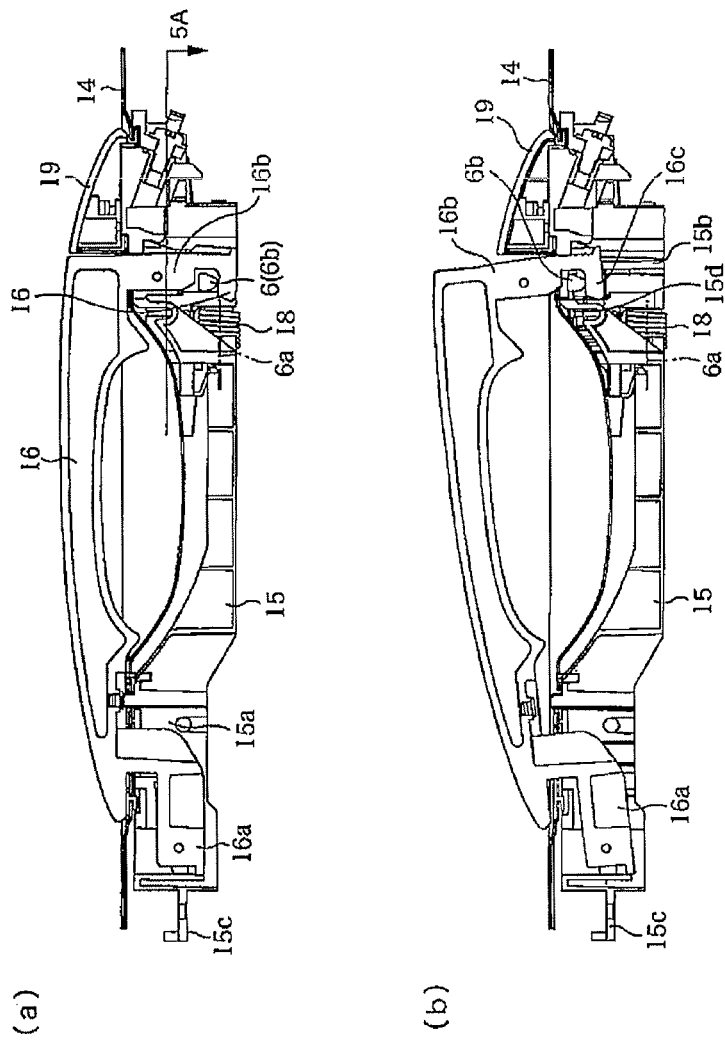
FIG. 2 shows an operation of the handle device, in which section (a) is a sectional view showing an initial rotation state of the operation of the handle device and section (b) is a sectional view showing an operating state of the operation of the handle device.

As shown in FIG. 1 and FIG. 2, a door handle device of a vehicle is formed in such a way that an operation handle 16 is rotatably connected to one end of a handle base 15 disposed along a rear surface of a door panel 14. In this embodiment, the handle device is mounted in a posture where a left side thereof in section (a) of FIG. 1 is directed toward the front of a vehicle. Hereinafter, in the present specification, with reference to a mounting posture to a vehicle, a longitudinal direction of a vehicle is referred to as "a front and rear".

Figure 3:
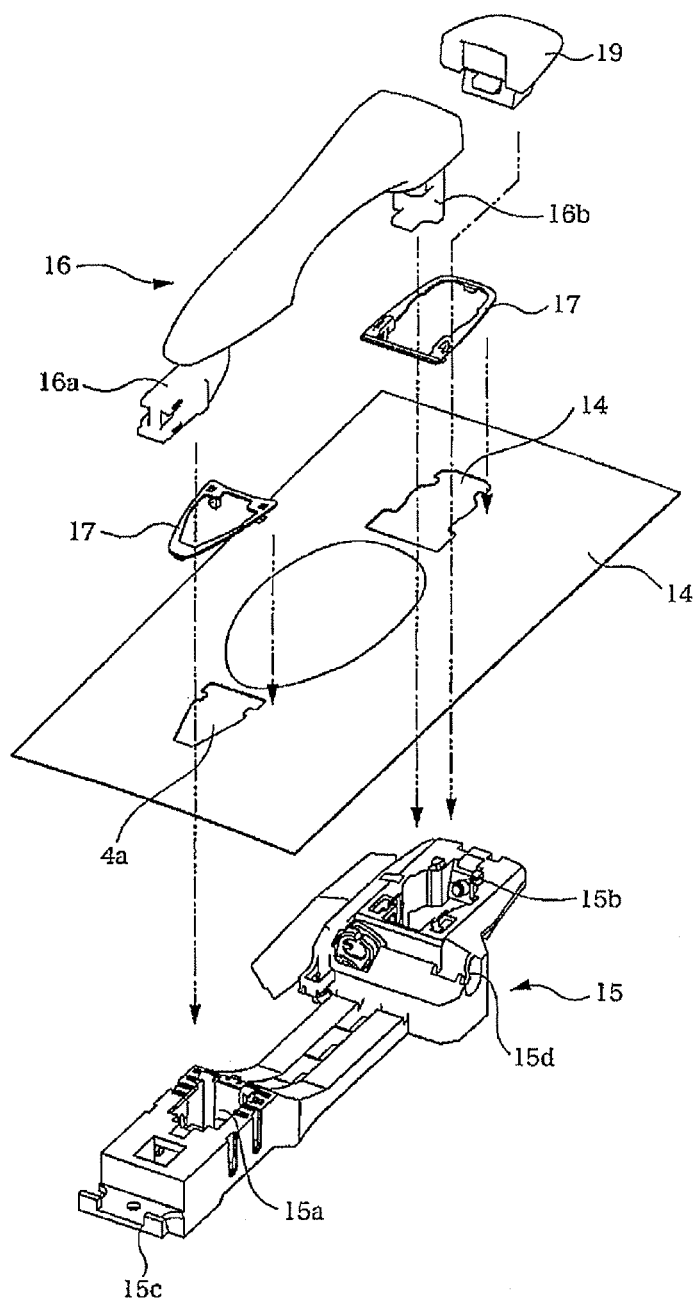
FIG. 3 is an exploded perspective view showing a mounting of the handle device.

The operation handle 16 includes a hinge leg 16a on a front end thereof and an operation leg 16b on a rear end thereof. As shown in FIG. 3, the hinge leg 16a is inserted into a door body through a front mounting opening 14a opened in the door panel 14, the operation leg 16b is inserted into the door body through a rear mounting opening 14b of the door panel 14 and then the whole operation handle 16 is mounted while being slid forward. A gasket 17 is interposed between the operation handle 16 and the surface of the door panel 14 so as to surround the mounting opening 14a, 14b.

Meanwhile, at a front end of the handle base 15, a front opening 15a for accommodating the hinge leg 16a of the operation handle 16 is provided and a rear opening 15b for accommodating the operation leg 16*b* of the operation handle 16 are provided so as to correspond to the rear mounting opening 14*b*.

Further, a lever (movable member 6) is rotatably connected to the handle base 15 by a pivot 6*a* that is long in a front-rear direction and the lever 6 is urged toward an initial rotation position by a torsion spring 18 that is mounted in a state of being wound around the pivot 6*a*. The lever includes an actuation arm 6*b* that is long in a direction perpendicular to the pivot 6*a*. In the initial rotation position, the lever directly faces a front end surface of a lower end of the inserted operation leg 16*b*.

When the operation handle 16 is slid forward in a state where the hinge leg 16*a* and the operation leg 16*b* are inserted into the front and rear openings 15*a*, 15*b*, the lever 6 having received a component force from a contact portion between the front end surface of the lower end of the operation leg 16*b* and a rear end surface of the actuation arm 6*b* is rotated in an actuation direction (a direction in which a deflection angle of the torsion spring 18 is increased) against an urging force of the torsion spring 18 and locked to a locking end 16*c* of the operation leg 16*b*. Then, the lever applies, to the operation handle 16, an urging force in a direction of the initial rotation position shown in section (a) of FIG. 2.

In the operation handle 16 in a state of being mounted to the handle base 15, the front end of the hinge leg 16*a* and the front opening 15*a* of the handle base 15 are in a sliding contact state through an arc-shaped sliding contact surface (not shown) at a suitable location. The operation handle 16 can be operated to rotate around a pseudo rotation center by raising a rear end thereof.

After the operation handle 16 is mounted to the handle base in the manner described above, the handle base 15 is finally fixed to the door panel 14 using a fixing portion 15*c* and a fixing member 19 mounted to the rear opening 15*b*. In this state, the fixing member 19 restricts the rearward movement of the operation handle 16 and therefore the detachment of the operation handle 16 is prevented.

Further, in this embodiment, a counterweight 20 is mounted to the handle base 15 in coaxial with the lever 6 and cancels an inertia force generated in the operation handle 16 when a side collision force is applied to a vehicle, so that an inadvertent door opening operation of the operation handle 16 is prevented.

In order to transmit a rotational operating force of the operation handle 16 to a door lock device 21 disposed in a door body, a cable device 5 is connected to the lever 6. As shown in section (b) of FIG. 4, the cable device 5 is a so-called pull-use cable device that is actuated by loading a tensile force to an inner wire 1. The cable device 5 includes an inner cable 3 configured by fixing a spherical cable end 2 to a leading end of the inner wire 1 and an outer casing 4 through which the inner wire 1 of the inner cable 3 can be freely inserted during movement. The cable device is retained in a predetermined position by locking a fixture 4*a* formed in a leading end of the outer casing 4 to a cable locking portion 15*d* formed in the handle base 15 (see section (a) of FIG. 1 and section (b) of FIG. 1).

In addition to the spherical shape, a bale shape, a rod shape or the like can be suitably used as the shape of the cable end 2.

Meanwhile, a pair of wing pieces 7 is provided at positions suitably spaced away from the insertion position of the pivot 6*a* of the lever 6. These wing pieces 7 are provided to face each other at an interval that allows passage of the inner wire 1 but does not allow passage of the cable end 2, thereby forming an inner wire insertion area 12. A cable introduction opening 8 communicating with the inner wire insertion area 12 is opened at one of the wing pieces 7.

The cable introduction opening 8 includes a cable end passing part 9 through which the cable end 2 of the inner cable 3 can be inserted and a wire passing part 13 reaching an end edge of the wing piece 7 in a straight line form with a side edge of the cable end passing part 9 being as a base end. The cable end passing part 9 has an elliptical shape in which one half-circle of a circular hole for allowing passage of the cable end 2 is spaced from the other half-circle. Also in the other wing piece 7 opposite to the wing piece 7 having the cable introduction opening 8 formed thereon, an end fitting part 10 having a bottom end is formed at an opposite location (see section (a) of FIG. 4 to FIG. 5). The end fitting part 10 has the same form as the cable end passing part 9 and is adjacent to a die cutting hole 10'.

Further, a projecting piece-like cover 11 is provided at an extending portion 9*a* including the one half-circle of the cable end passing part 9. The cover 11 is formed in a range where the cable end 2 can pass through the area other than the cover and the cable end 2 can be detached from the cable end passing part 9 when the cable end 2 is moved to a termination of the extending portion 9*a*.

Further, in the inner wire insertion area 12 formed between the wing pieces 7, a termination wall surface defined by the wire passing part 13 is further extended in the rear direction and therefore a culvert-shaped extending portion 12' sandwiched between the wing pieces 7 is formed.

Figure 4:
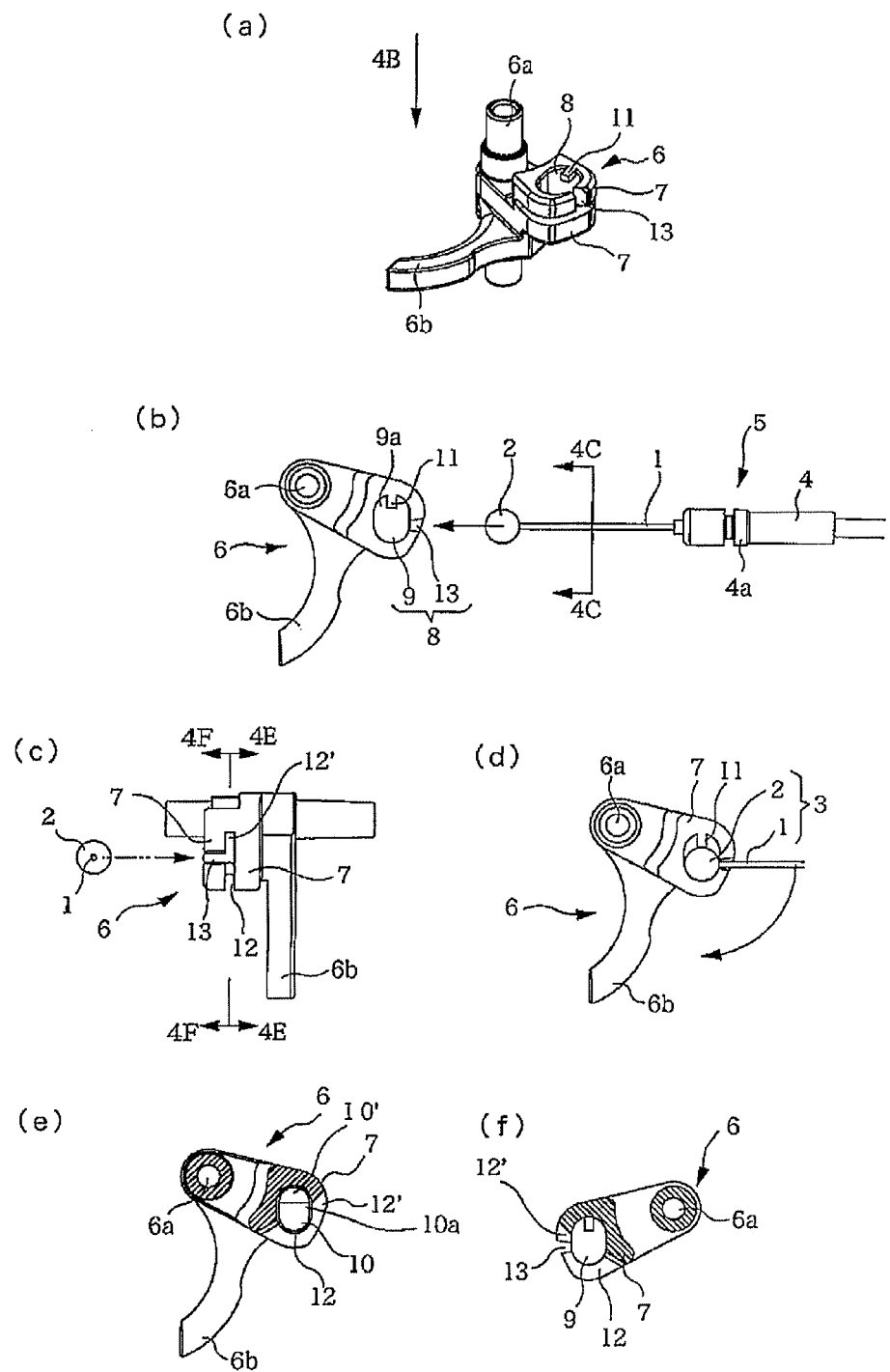
FIG. 4 shows a lever and a cable device, in which section (a) is a perspective view of the lever, section (b) is a view as seen in a direction of an arrow 4B in section (a) of FIG. 4, section (c) is a sectional view taken along a line 4C-4C in section (b) of FIG. 4, section (d) is an explanatory view showing a mounting procedure of the cable device, section (e) is a sectional view taken along a line 4E-4E in section (c) of FIG. 4 and section (f) is a sectional view taken along a line 4F-4F in section (c) of FIG. 4.
Figure 5:
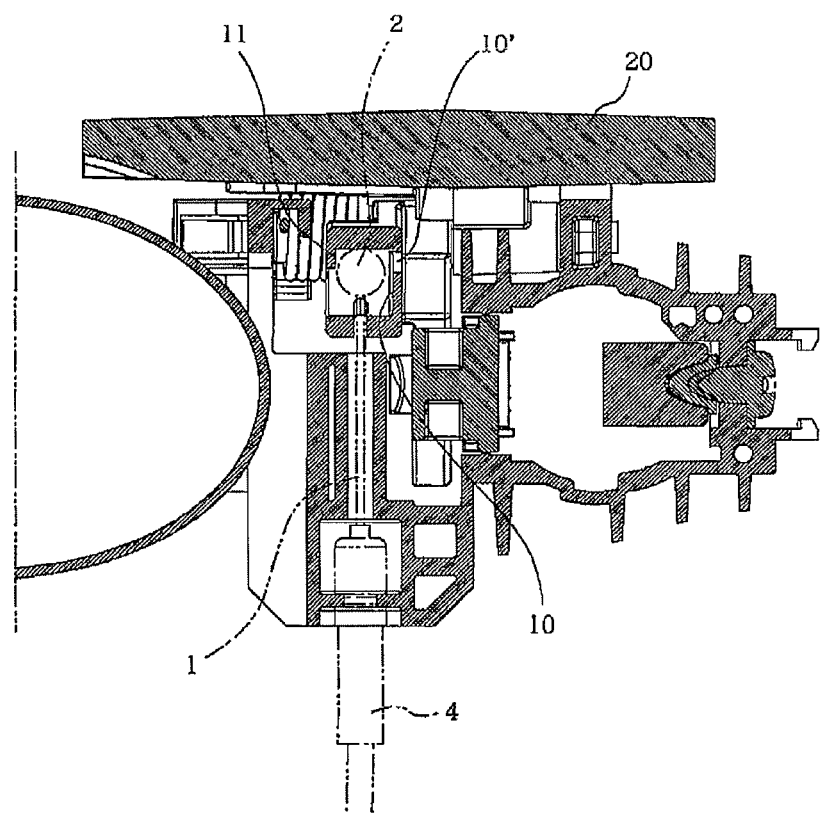
FIG. 5 is a sectional view taken along a line 5A in section (a) of FIG. 2.

The connection of the inner cable 3 to the lever 6 configured described above is made by, first, passing the cable end 2 through the cable end passing part 9 in a state where the inner wire 1 directly faces the wire passing part 13, as shown in section (b) of FIG. 4 and section (c) of FIG. 4, introducing the inner wire 1 between the wing pieces 7, i.e., to the inner wire insertion area 12 and then rotating the whole cable device 5 about the cable end 2, as shown in section (d) of FIG. 4.

By rotating the inner wire 1 from the mounted operating position, the inner wire 1 is deviated from the wire passing part 13 and thus moved to the culvert-shaped portion having both sides held between the wing pieces 7, thereby restricting the detachment of the inner wire from the inner wire insertion area 12. At the same time, the opposite areas of the cable end 2 are fitted between the cable end passing part 9 and the end fitting part 10 and therefore the movement of the cable end 2 to the wire passing part 13 is restricted. In this manner, there is no case that the inner wire is detached from the lever 6.

Figure 6:
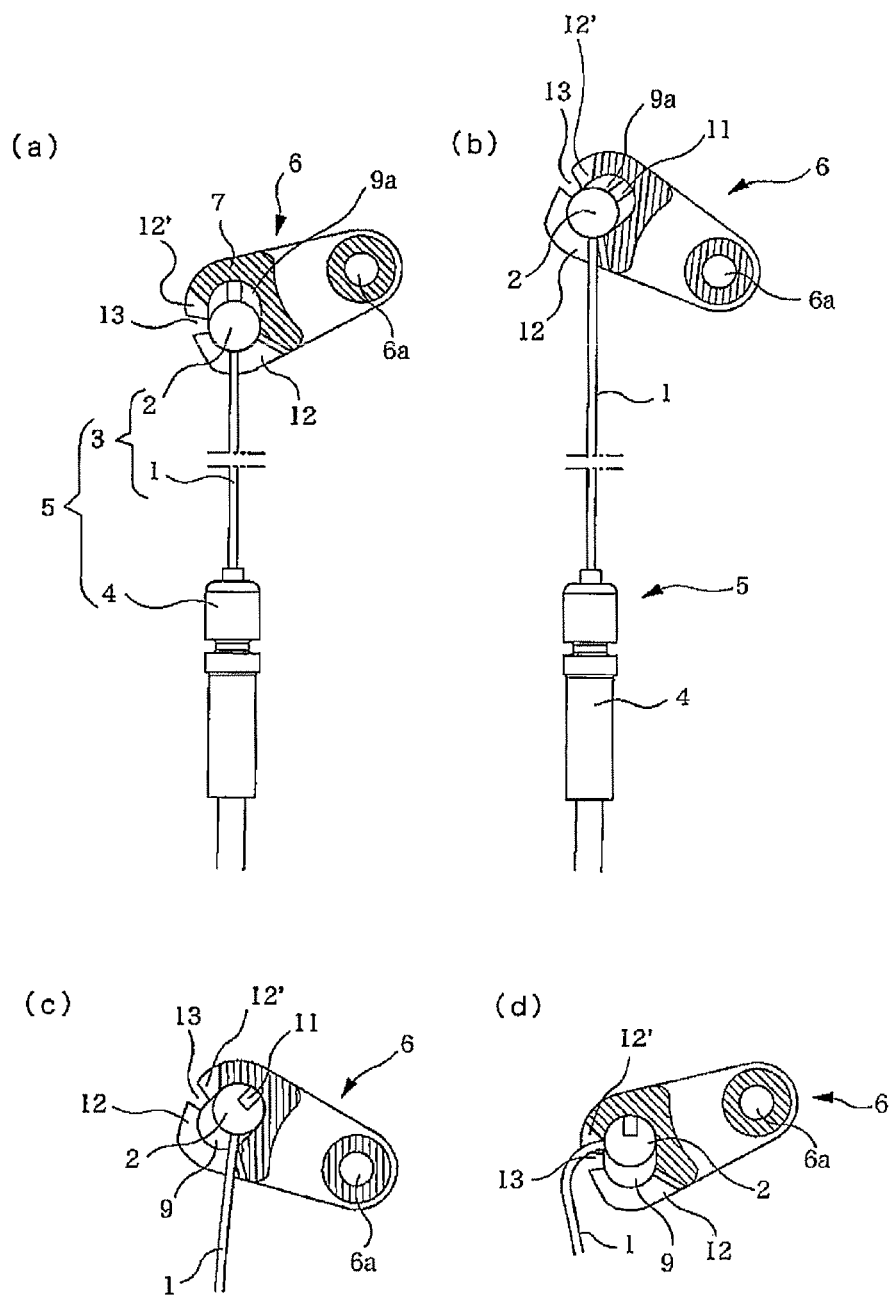
FIG. 6 shows an operation of the lever, in which section (a) is a view showing an initial state of the operation of the lever, section (b) is a view showing an operating state of the operation of the lever, section (c) is a view showing a state of an inner wire just before occurrence of buckling in the operation of the lever and section (d) is a view showing a buckling state of the inner wire in the operation of the lever.

In this state, when the lever 6 is operated to rotate about the pivot 6*a* from an initial rotation position shown in section (a) of FIG. 6, a tensile force is loaded to the cable end 2 through the one half-circle and the inner cable 3 is drawn as shown in section (b) of FIG. 6, thereby actuating the door lock device.

Then, when an operation to the operation handle 16, i.e., an rotational operation force to the lever 6 is released, the lever 6 is returned to its initial rotation position by a restoring force of the torsion spring 18, and at the same time a returning force from the door lock side is transmitted to the inner wire 1, so that the cable end 2 on the side of the lever 6 is returned to its initial position in synchronous with the movement of the lever.

Meanwhile, in the pull-use cable device 5, it is not possible to drive the inner wire 1 by a compressive force. Accordingly, in a case where a drive force from the door lock side is not actuated due to the fact that the sliding resistance of the inner wire 1 in the outer casing 4 is increased during the returning operation, or the like, an operating force in a compressive direction is applied to the inner wire 1 through the cable end 2.

This state is shown in section (c) of FIG. 6. The cable end 2 remains in an actuation position by rigidity of the inner wire 1 when an operating force (tensile force) through the inner wire 1 is not applied to the cable end 2. When only the lever 6 is moved to its initial rotation position side in this state, the cable end 2 is relatively moved to the extending portions 9a, 10a of the cable end passing part 9 and the end fitting part 10 under a no-load condition.

Then, in a case where the lever 6 is rotated to its initial rotation position side and therefore a compressive force is loaded to the inner wire 1 through the cable end 2, as shown in section (d) of FIG. 6, the inner wire 1 is subjected to a buckling distortion but the cable end 2 still remains at the extending portions 9a, 10a of the cable end passing part 9 and the end fitting part 10. Further, a buckling start point corresponds to the position of the cable end 2 and therefore the buckling distortion is absorbed by the extending portion 12' of the inner wire insertion area 12. Accordingly, since the inner wire 1 directly faces the wire passing part 13 and therefore is not detached to the outside, the detachment of the inner cable 3 from the wire mounting portion is securely prevented.

According to the above embodiment, the cable connection structure for connecting the substantially spherical cable end 2 provided at a leading end of the inner wire 1 to the movable member 6 is provided. In the cable connection structure, the movable member 6 may include a pair of wing pieces 7 for holding the inner wire 1, the cable introduction opening 8 for guiding the cable end 2 between the wing pieces 7 and the substantially elliptical cable end passing part 9 for supporting the cable end 2 in a displaceable manner. A long axis of the cable end passing part 9 may substantially coincide with a cable introduction direction.

Further, according to the above embodiment, the cable connection structure to the movable member is provided for connecting, to the movable member 6, the cable device 5 in which the inner cable 3 configured by fixing the cable end 2 to a leading end of the inner wire 1 is slideably inserted into the outer casing 4. The movable member 6 is provided with a pair of wing pieces 7 facing each other in an interval allowing the insertion of the inner wire 1. The cable introduction opening 8 for guiding the leading end of the inner cable 3 between the wing pieces 7 is opened at one of the wing pieces 7. The end fitting part 10 for locking the cable end 2 introduced between the wing pieces 7 in cooperation with the cable end passing part 9 of the cable introduction opening 8 is provided at the other of the wing pieces 7. Further, the cable end passing part 9 and the end fitting part 10 may be configured to extend to a position where the movement of the cable end 2 in an opposite direction with respect to a contact edge to the cable end 2 during operation of the inner cable 3 is allowed and the inner wire 1 rotated around the cable end 2 in a longitudinal end does not overlap with the entire length of the cable introduction opening 8.

According to the above embodiment, the connection of the cable device 5 to the movable member 6 is made, as shown in FIG. 4, by passing a leading end of the inner cable 3, i.e., the cable end 2 and a leading end of the inner wire 1 located at a base end of the cable end 2 through the cable introduction opening 8 to locate the inner wire 1 between the wing pieces 7 and then rotating the entire cable device 5 around the cable end 2. In a mounting completion state, opposite ends of the end cable are fitted into the cable end passing part 9 of the cable introduction opening 8 and the end fitting part 10 facing the cable end passing part and therefore the movable member 6 and the inner cable 3 are connected to each other. Further, the inner wire 1 is fitted between the wing pieces 7 and therefore the movement of the inner wire in an opening direction of the cable introduction opening 8 is restricted. With this configuration, the detachment of the inner cable 3 from the movable member 6 is prevented.

Figure 7:
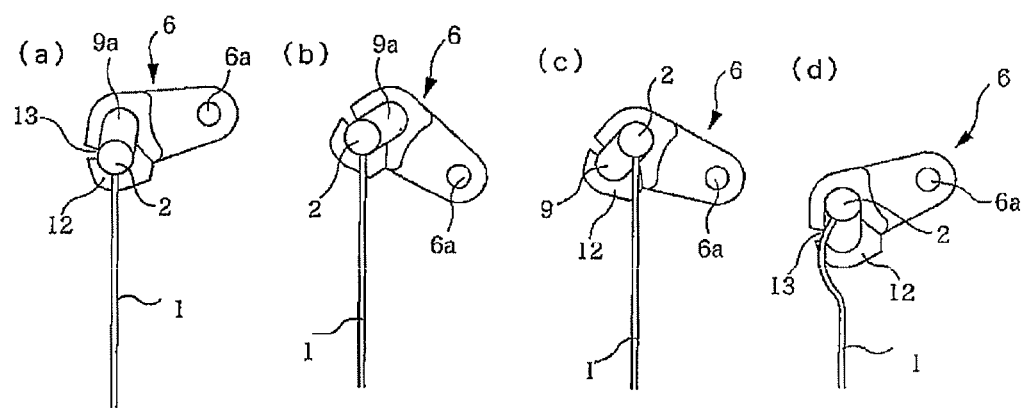
FIG. 7 shows an operation of a structure according to the embodiment, in which section (a) shows an initial state, section (b) shows an operating state, section (c) shows a state of the inner wire just before occurrence of buckling and section (d) shows a buckling state of the inner wire.

When the movable member 6 is rotated around the pivot 6a from an initial position shown in section (a) of FIG. 7 to an actuation position shown in section (b) of FIG. 7 in order to transmit an operating force of the movable member 6 to an operation target using a pull-specification cable, one end of the cable end passing part 9 of the cable introduction opening 8 and the end fitting part 10 are locked to the cable end 2 to pull up the cable end. In this way, the operation target is actuated.

In a case where the inner wire 1 is caught in the actuation position shown in section (b) of FIG. 7 and therefore the cable end 2 does not follow the movable member 6, only the movable member 6 is moved while the cable end 2 remains at that position, as shown in section (c) of FIG. 7. Accordingly, the cable end 2 is moved to the extending portions 9a, 10a of the cable end passing part 9 and the end fitting part 10. When the movable member 6 is further moved in that state, a compressive force is loaded to the inner wire 1 and thus a buckling distortion occurs. It is known that the buckling distortion with a pin support point being a load point starts to be bent directly from the pin support point, unlike a case of a fixation end load. Here, the cable end 2 and the end fitting part 10 are considered as a rotatable pin support point. Further, even in this example where the inner cable 3 itself has proper rigidity, distortion in a rotation direction of the inner cable 3 rotating about the cable end 2 occurs in an initial state where the rotation of the cable end 2 is allowed. Thereafter, the buckling distortion proceeds in a state where the side walls of the extending portions 9a, 10a and the inner cable 3 are in contact with each other.

Here, according to the above embodiment, since the extending portions 9a, 10a extend to a position where the inner wire 1 rotated around the cable end 2 in a longitudinal end does not overlap with the entire length of the cable introduction opening 8, there is no case that the inner wire 1 directly faces over the entire length of the wire passing part 13 in the procedure of the buckling distortion. Therefore, the inner wire 1 is still maintained in a state of being fitted between the wing pieces 7 even after occurrence of the buckling, so that the detachment of the inner cable 3 from the movable member 6 is securely prevented.

In the above structure, the extending portion 9a of the cable end passing part 9 may be covered with the cover 11. According to this structure, it is possible to completely prevent the detachment of the cable end 2 from the extending portions 9a, 10a.

Furthermore, according to the above embodiment, the cable connection structure to the movable member is provided for connecting, to the movable member 6, the cable device 5 in which the inner cable 3 configured by fixing the cable end 2 to a leading end of the inner wire 1 is slideably inserted into the outer casing 4. The movable member 6 is provided with a pair of wing pieces 7 facing each other in an interval allowing the insertion of the inner wire 1. The cable introduction opening 8 for guiding the leading end of the inner cable 3 between the wing pieces 7 is opened at one of the wing pieces 7. The end fitting part 10 for locking the cable end 2 introduced between the wing pieces 7 in cooperation with the cable end passing part 9 of the cable introduction opening 8 is provided at the other of the wing pieces 7. Further, the inner wire insertion area 12 between the wing pieces 7 may be configured to extend beyond a longitudinal end edge defined by the wire passing part 12 of the cable introduction opening 8.

Figure 8:
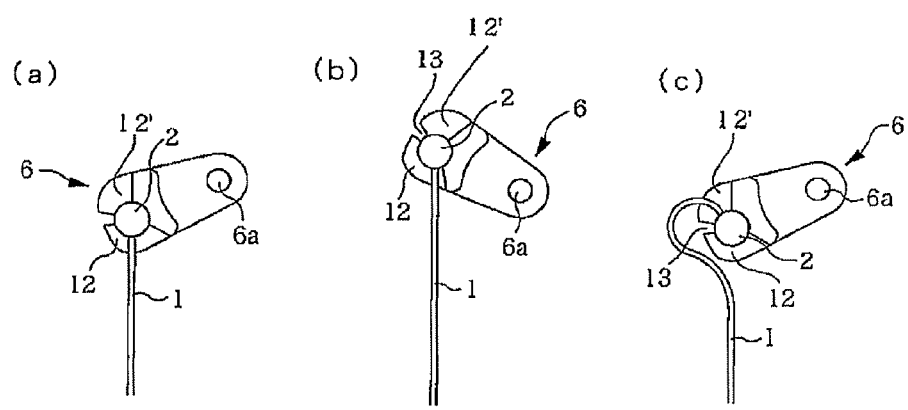
FIG. 8 shows an operation of another embodiment, in which section (a) shows an initial state, section (b) shows an operating state and section (c) shows a buckling state of the inner wire.

When the buckling load is loaded to the inner wire 1, as shown in section (c) of FIG. 8, a rotation force around the pin support point (a contact position of the cable end 2 and the end fitting part 10) is generated and thus the inner wire 1 exceeds the wire passing part 13 to reach the culvert-shaped extending portion 12'. Thereafter, the inner wire is pressed against the innermost wall of the extending portion 12' by the buckling load.

According to the above structure, although the inner wire 1 proceeds via a position where the inner wire directly faces the wire passing part 13 in the procedure of the buckling distortion, the inner wire is immediately pressed against the extending portion 12' without staying at that position and an operation force to the movable member 6 serves as a force to press the inner wire 1 against the innermost wall of the extending portion 12'. Therefore, the detachment of the inner cable 3 from the movable member 6 is securely prevented.

Furthermore, according to the above embodiment, the cable connection structure to the movable member is provided for connecting, to the movable member 6, the cable device 5 in which the inner cable 3 configured by fixing the cable end 2 to a leading end of the inner wire 1 is slideably inserted into the outer casing 4. The movable member 6 is provided with a pair of wing pieces 7 facing each other in an interval allowing the insertion of the inner wire 1. The cable introduction opening 8 for guiding the leading end of the inner cable 3 between the wing pieces 7 is opened at one of the wing pieces 7. The end fitting part 10 for locking the cable end 2 introduced between the wing pieces 7 in cooperation with the cable end passing part 9 of the cable introduction opening 8 is provided at the other of the wing pieces 7. Further, the cable end passing part 9 and the end fitting part 10 may extend in an opposite direction with respect to a contact edge to the cable end 2 during operation of the inner cable 3 and the inner wire insertion area between the wing pieces 7 may be configured to extend beyond a longitudinal end edge defined by the wire passing part 12.

According to the above structure, in a case where the buckling load is loaded to the inner wire 1, as shown in section (d) of FIG. 6, the cable end 2 is moved to the extending portions 9a, 10a of the cable end passing part 9 and the end fitting part 10 and then subjected to the buckling distortion. Since the load point of the buckling load is displaced to an end of the extending portions 9a, 10a, there is little case that the inner wire directly faces the wire passing part 13 in the procedure of the rotation buckling distortion of the inner wire, and the inner wire stays at the extending portion 12' of the wire passing part 13. Therefore, the detachment of the inner cable 3 from the movable member 6 is securely prevented.

According to the above embodiment, it is possible to securely prevent the detachment of the cable device from the movable member.

DESCRIPTION OF REFERENCE NUMERALS AND SIGNS

1: Inner Wire
2: Cable End
3: Inner Cable
4: Outer Casing
5: Cable Device
6: Movable Member
7: Wing Piece
8: Cable Introduction Opening
9: Cable End Passing Part
10: End Fitting Part
11: Cover
12: Inner Wire Insertion Area
13: Wire Passing Part
14: Door Panel
15: Handle Base
16: Operation Handle

The invention claimed is:

1. A cable connection structure to a movable member, for connecting a cable end provided at a leading end of an inner wire to the movable member,
the movable member comprising:
a pair of wing pieces that face each other in an interval allowing insertion of the inner wire and hold the inner wire;
a cable introduction opening for guiding the cable end between the wing pieces;
an inner wire insertion area, formed between the pair of wing pieces, that includes a culvert-shaped extending portion that restricts detachment of the inner wire from the inner wire insertion area;
a substantially elliptical cable end passing part that supports the cable end in a rotatable and displaceable manner; and
a pivot,
wherein a long axis of the substantially elliptical cable end passing part substantially coincides with a direction in which a tensile force of a returning force is loaded to the cable end,
wherein the moveable member pivots at the pivot with respect to a handle base,
wherein a longitudinal direction of the substantially elliptical cable end passing part is a first direction,
wherein a short direction of the substantially elliptical cable end passing part is a second direction,
wherein a third direction is perpendicular to the first direction and the second direction, and
wherein when the cable end is positioned in an extending portion of the substantially elliptical cable end passing part, a tip of the cable end is covered with a cover in the third direction.

2. The cable connection structure to the movable member according to claim 1, wherein the cable introduction opening for guiding a leading end of an inner cable configured of the inner wire and the cable end between the wing pieces is opened at one of the pair of wing pieces and an end fitting part that locks the cable end introduced between the wing pieces in cooperation with the substantially elliptical cable end passing part of the cable introduction opening is provided at the other of the wing pieces and,
wherein the substantially elliptical cable end passing part and the end fitting part extend to a position where movement of the cable end in an opposite direction with respect to a contact edge to the cable end during operation of the inner cable is allowed and the inner wire rotated around the cable end in a longitudinal end does not overlap with the entire length of the cable introduction opening.

3. The cable connection structure to the movable member according to claim 1, wherein the cable introduction opening for guiding a leading end of an inner cable configured of the inner wire and the cable end between the wing pieces is opened at one of the pair of wing pieces and an end fitting part that locks the cable end introduced between the wing pieces in cooperation with the substantially elliptical cable end passing part of the cable introduction opening is provided at the other of the wing pieces and, wherein the inner wire insertion area formed between the pair of wing pieces extends beyond a longitudinal end edge defined by a wire passing part of the cable introduction opening.

4. The cable connection structure to the movable member according to claim 1, wherein the cable introduction opening for guiding a leading end of an inner cable configured of the inner wire and the cable end between the wing pieces is opened at one of the pair of the wing pieces and an end fitting part that locks the cable end introduced between the wing pieces in cooperation with the substantially elliptical cable end passing part of the cable introduction opening is provided at the other of the wing pieces, wherein the substantially elliptical cable end passing part and the end fitting part extend in an opposite direction with respect to a contact edge to the cable end during operation of the inner cable and the inner wire insertion area formed between the pair of wing pieces extends beyond a longitudinal end edge defined by the wire passing part.

5. A vehicle door handle device that actuates a door lock in a door body through a cable device connected to a cable connection part in such a way that the movable member is mounted to a handle base fixed to a door panel and including the cable connection structure described in claim 1 is driven to rotate by an operation handle rotatably connected to the handle base.

6. The cable connection structure to the movable member according to claim 1, wherein the inner wire insertion area is formed by the pair of wing pieces.

7. The cable connection structure to the movable member according to claim 1, wherein a wire passing part is formed at one of the pair of wing pieces.

8. The cable connection structure to the movable member according to claim 1, wherein a wire passing part is a boundary of the culvert-shaped extending portion of the inner wire insertion area.

9. The cable connection structure to the movable member according to claim 7, wherein the wire passing part and a long axis of the substantially elliptical cable end passing part are substantially perpendicular to each other.

10. The cable connection structure to the movable member according to claim 2, wherein the extending portion of the substantially elliptical cable end passing part is covered with the cover.

11. A vehicle door handle device that actuates a door lock in a door body through a cable device connected to a cable connection part in such a way that the movable member is mounted to a handle base fixed to a door panel and including the cable connection structure described in claim 2 is driven to rotate by an operation handle rotatably connected to the handle base.

12. A vehicle door handle device that actuates a door lock in a door body through a cable device connected to a cable connection part in such a way that the movable member is mounted to a handle base fixed to a door panel and including the cable connection structure described in claim 4 is driven to rotate by an operation handle rotatably connected to the handle base.

13. A vehicle door handle device that actuates a door lock in a door body through a cable device connected to a cable connection part in such a way that the movable member is mounted to a handle base fixed to a door panel and including the cable connection structure described in claim 3 is driven to rotate by an operation handle rotatably connected to the handle base.

14. The cable connection structure to the movable member according to claim 3, wherein the inner wire insertion area extends in a first direction and a second direction beyond the longitudinal end edge, and wherein the first direction is opposite to the second direction.

15. A cable connection structure to a movable member, for connecting a cable end provided at a leading end of an inner wire to the movable member, the movable member comprising:

a pair of wing pieces that face each other in an interval allowing insertion of the inner wire and hold the inner wire;

a cable introduction opening for guiding the cable end between the wing pieces;

an inner wire insertion area, formed between the pair of wing pieces, that includes a culvert-shaped extending portion that restricts detachment of the inner wire from the inner wire insertion area;

a substantially elliptical cable end passing part that supports the cable end in a rotatable and displaceable manner when the cable end is completely disposed within the elliptical boundary of the elliptical cable end passing part, wherein a long axis of the substantially elliptical cable end passing part substantially coincides with a direction in which a tensile force or a returning force is loaded to the cable end, wherein a longitudinal direction of the substantially elliptical cable end passing part is a first direction, wherein a short direction of the substantially elliptical cable end passing part is a second direction, wherein a third direction is perpendicular to the first direction and the second direction, and wherein when the cable end is positioned in an extending portion of the substantially elliptical cable end passing part, a tip of the cable end is covered with a cover in the third direction.

16. The cable connection structure to the movable member according to claim 1, wherein the culvert-shaped extending portion includes a groove shape.

17. The cable connection structure to the movable member according to claim 15, wherein the culvert-shaped extending portion includes a groove shape.

18. The cable connection structure to the movable member according to claim 1, wherein when the inner wire is subjected to a buckling distortion and the cable end remains at the extending portion of the substantially elliptical cable end passing part, the buckling distortion is absorbed by the culvert-shaped extending portion.

19. The cable connection structure to the movable member according to claim 14, wherein the extending portion of the substantially elliptical cable end passing part is covered with the cover, and wherein when the inner wire is subjected to a buckling distortion and the cable end remains at the extending portion of the substantially elliptical cable end passing part, the buckling distortion is absorbed by the culvert-shaped extending portion.

* * * * *